United States Patent [19]

Yanagihara et al.

[11] Patent Number: 5,142,866
[45] Date of Patent: Sep. 1, 1992

[54] SEQUENTIAL TURBOCHARGER SYSTEM FOR AN INTERNAL COMBUSTION ENGINE

[75] Inventors: Hiromichi Yanagihara; Shinobu Ishiyama; Taiichi Mori; Toshiyuki Maehara, all of Shizuoka, Japan

[73] Assignee: Toyota Jidosha Kabushiki Kaisha, Toyota, Japan

[21] Appl. No.: 717,881

[22] Filed: Jun. 17, 1991

[30] Foreign Application Priority Data

Jun. 20, 1990 [JP] Japan .................. 2-160014

[51] Int. Cl.[5] .................. F02B 37/12; F02M 25/07
[52] U.S. Cl. .................. 60/605.2; 60/612
[58] Field of Search .................. 60/605.2, 612

[56] References Cited

U.S. PATENT DOCUMENTS

| 3,906,729 | 9/1975 | Connor et al. | 60/600 |
| 4,474,008 | 10/1984 | Sakurai et al. | 60/605.2 |
| 4,669,442 | 6/1987 | Nakamura et al. | 60/605.2 |

FOREIGN PATENT DOCUMENTS 82526 5/1984 Japan .
14267 1/1985 Japan .

Primary Examiner—Michael Koczo
Attorney, Agent, or Firm—Kenyon & Kenyon

[57] ABSTRACT

A sequential turbocharger system for an internal combustion engine with an exhaust gas recirculation system. The sequential system includes a large-volume turbocharger and a small-volume turbocharger, which are arranged in series in the direction of the flow of gases. A bypass passageway is connected to an exhaust pipe to thereby bypass the turbine of the small-volume turbocharger, and an exhaust switching valve is arranged in the bypass passageway for controlling the flow of exhaust gas to the turbine of the small-volume turbocharger. The EGR system includes an exhaust gas recirculation passageway for introducing an amount of exhaust gas into the intake pipe of the engine. The exhaust gas for recirculation is taken out from the intake pipe at a position located between the turbines of the small-volume and large-volume turbochargers.

10 Claims, 9 Drawing Sheets

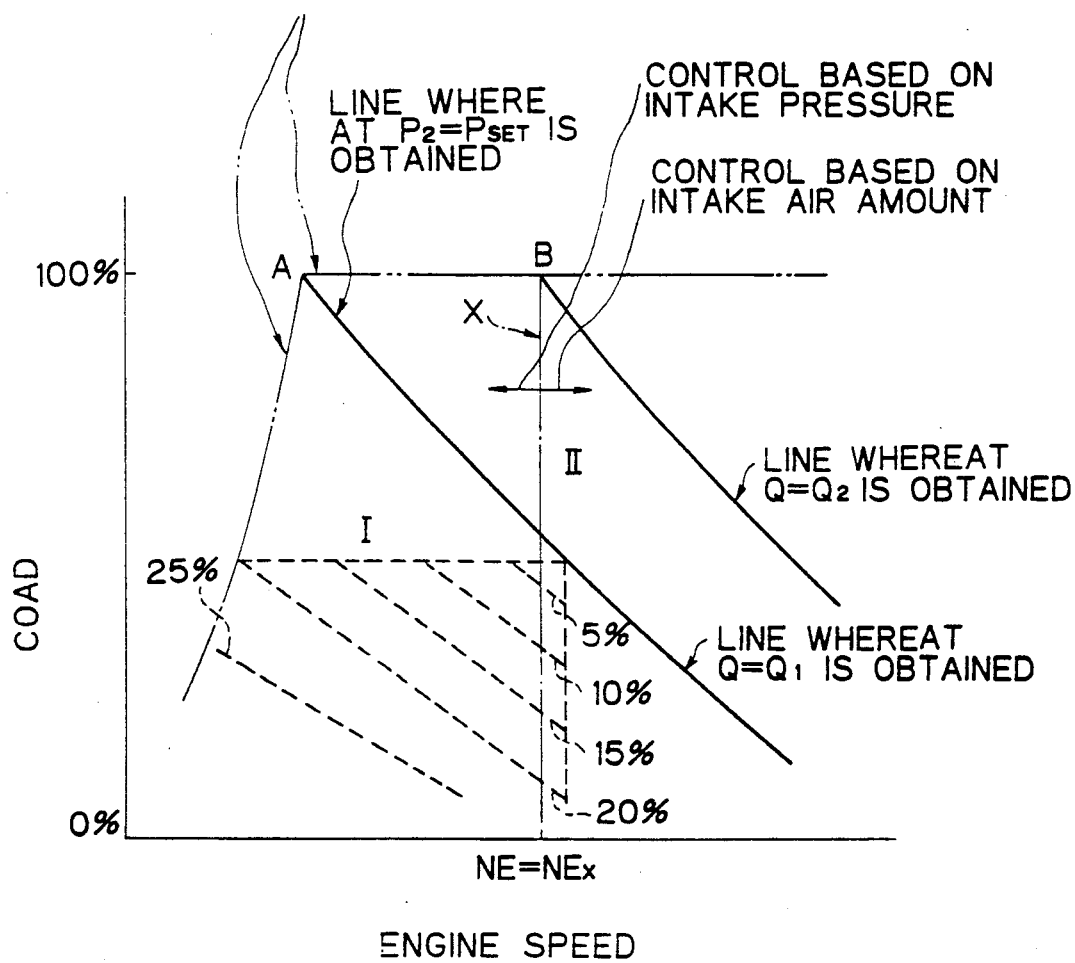

SEQUENTIAL TURBOCHARGER SYSTEM FOR AN INTERNAL COMBUSTION ENGINE

BACKGROUND OF THE INVENTION

1. Field of the Invention

The present invention relates to a device for recirculation of an exhaust gas in a series-mounted two-stage turbocharged internal combustion engine.

2. Description of the Related Art

In a known series-mounted two-stage turbocharged internal combustion engine, a large volume and a small volume turbocharger are arranged in series along the direction of the flow of gas (see Japanese Unexamined Patent Publication No. 50-129815). Such a two-stage turbocharger system is used for obtaining a wide range turbocharging operation, from a low engine speed area to a high engine speed area. Namely, when the engine speed is low, a turbocharging operation is obtained by a turbocharger having a small volume, and when the engine speed is high, a turbocharging operation is obtained by a turbocharger having a large volume. An exhaust bypass passageway is provided in the small-volume turbocharger, to bypass a turbine thereof, and an exhaust switching valve is arranged in the bypass passageway. The exhaust switching valve closes the bypass passageway when the engine is in a low speed condition, at which the large-volume turbocharger is not yet fully activated, so that all of the flow of the exhaust gas from the engine is introduced into the small-volume turbocharger, to obtain a turbocharging operation by the small-volume turbocharger. The exhaust switching valve opens the bypass passageway when the engine is in a high speed condition, at which the large-volume turbocharger is fully activated, and thus the flow of the exhaust gas bypasses the small-volume turbocharger and the turbocharging effect is obtained only from the large-volume turbocharger.

Also known is an exhaust gas recirculation system for reducing the amount of nitrogen oxide emissions from the gases exhausted from an internal combustion engine, with a single turbocharger, where an amount of exhaust gas is taken out from an engine exhaust line at a location upstream of the turbine of the turbocharger, and introduced into an engine intake line (see Japanese Unexamined Utility Model Publication No. 61-151063).

When carrying out an exhaust gas recirculation (EGR) operation in an internal combustion engine provided with a two-stage sequential turbocharger system, as in the prior art for an internal combustion engine provided with single turbocharger, the exhaust gas to be recirculated also can be taken from the exhaust line at a position upstream of the turbochargers which are arranged in series. In this case, however, the parts of the exhaust gas recirculating system, which are less resistant to high temperatures, such as a diaphragm made of rubber of an exhaust gas recirculating valve, are often thermally damaged after a relatively short use, because the EGR system is subjected to the high temperature of the exhaust gas in the two-stage turbocharger system. To avoid this thermal damage to parts of EGR system, the exhaust gas for the EGR operation may be taken out from the engine exhaust line at a position downstream of the turbines of the series of the turbochargers, where the temperature of the exhaust gas is lower, but a substantial drop in the pressure of the exhaust gas occurs at such a position, and therefore, the pressure differential between the pressure at the position where the exhaust gas is taken out and the position where the exhaust gas is introduced into the intake line becomes small, and this makes it difficult to obtain a desired amount of exhaust gas to be recirculated.

SUMMARY OF THE INVENTION

An object of the present invention is to provide an EGR system capable of circulating a desired amount of exhaust gas while preventing a thermal damage of parts of the EGR system.

According to the present invention, an internal combustion engine is provided, comprising:

an engine body;

an intake line for introducing a combustible mixture into the engine body;

an exhaust line for removing exhaust gases from the engine body;

a first, large-volume turbocharger wherein a turbine thereof is arranged in the exhaust line and a compressor thereof is arranged in the intake line;

a second, small-volume turbocharger wherein a turbine thereof is arranged in the exhaust line at a position upstream of the turbine of the large-volume turbocharger, in the direction of the flow of exhaust gases, and a compressor thereof is arranged in the intake line at a position downstream of the compressor of the large-volume turbocharger, in the direction of the flow of the intake air;

a bypass passageway connected to the exhaust line so as to bypass the turbine of the small-volume turbocharger;

exhaust switching valve means for controlling a flow of the exhaust gases in said bypass passageway;

means, responsive to engine operating conditions, for controlling the exhaust switching valve means to obtain a desired pressure of the intake air, and;

exhaust gas recirculation means for taking out an amount of the exhaust gas from the exhaust line at a position located between the turbine of the large-volume turbocharger and the turbine of the small-volume turbocharger, and for introducing the taken out exhaust gas into the intake line.

BRIEF DESCRIPTION OF THE DRAWINGS

FIG. 9 is similar to FIG. 5, but is concerned with the second embodiment shown in FIG. 7.

DESCRIPTION OF THE PREFERRED EMBODIMENTS

Figure 1:
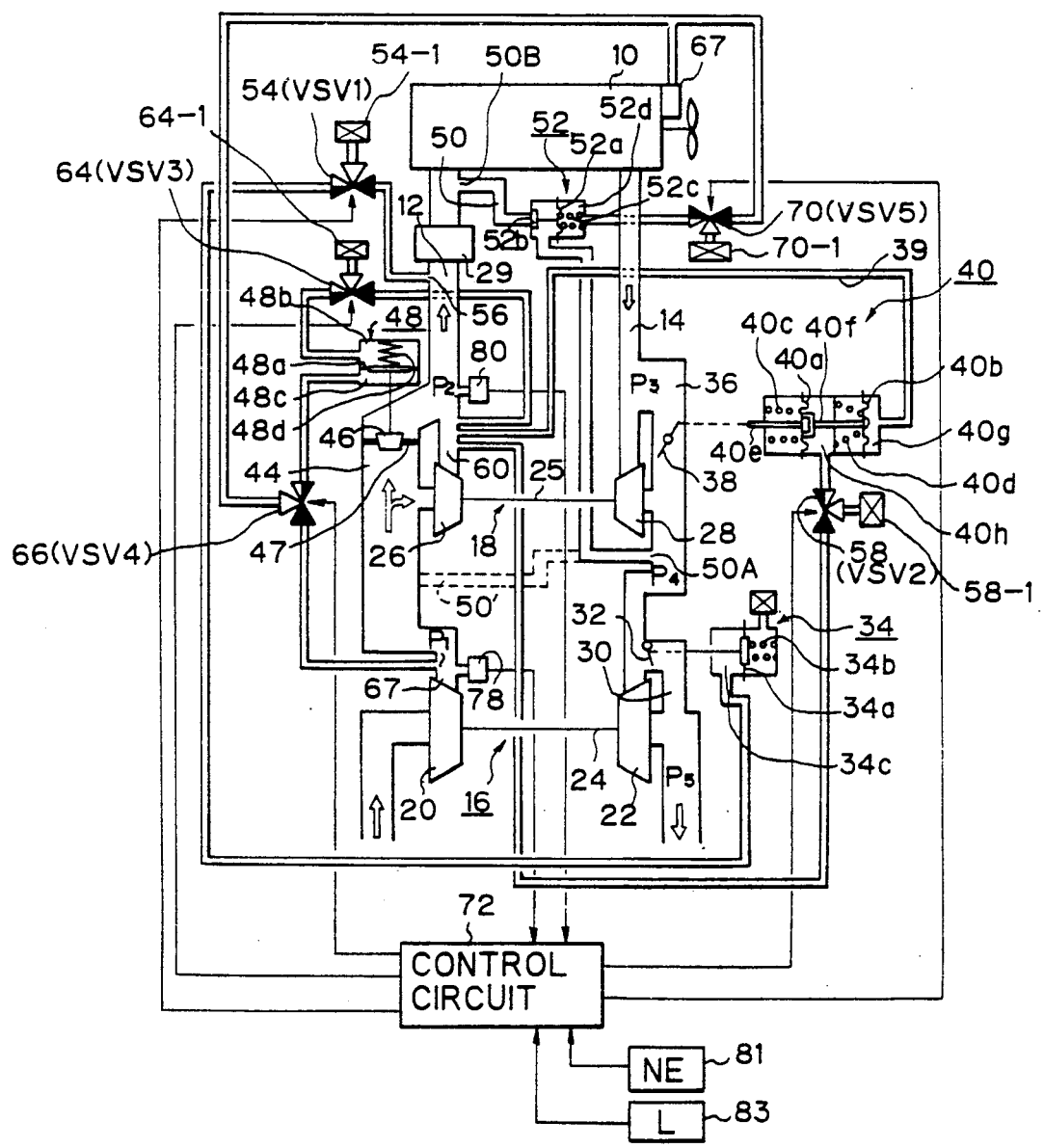
FIG. 1 is an entire, schematic view of an internal combustion engine according to the first embodiment of the invention.

In FIG. 1, showing a first embodiment of the present invention when applied a diesel engine, reference numeral 10 denotes an engine body to which an intake pipe 12 and an exhaust pipe 14 are connected. A large-volume turbocharger 16 and a small-volume turbocharger 18, which are arranged in series, are provided; the large-volume turbocharger 16 being provided with a compressor 20, a turbine 22 and a rotating shaft 24, and the small-volume turbocharger 18 being provided with a compressor 26, a turbine 28 and a rotating shaft 25. The compressor 20 of the large-volume turbocharger 16, and then the compressor 26 of the small-volume turbocharger 18 are arranged in the intake pipe 12, along the direction of the flow of the intake air. An intercooler 29 is arranged downstream of the compressor 26 of the small-volume turbocharger 18. The turbine 28 of the small-volume turbocharger 18, and then the turbine 22 of the large-volume turbocharger 16 are arranged in the exhaust pipe 14, along the direction of the flow of the exhaust gas.

A first bypass passageway 30 is connected to the exhaust pipe 14 so that the passageway 30 bypasses the turbine 22 of the large-volume turbocharger 22, and a swing-door type waste gate valve (exhaust gas bypass control valve) 32 is arranged for controlling the flow of the exhaust gas to the bypass passageway 30. A diaphragm actuator 34 is provided, for controlling the operation of the waste gate valve 32, and the actuator 34 is provided with a diaphragm 34a connected to the valve 32, and a spring 34b urging the diaphragm 34a such that the valve 32 usually closes the bypass passageway 30. The actuator 34 is provided with a chamber 34c to which a positive pressure is applied in the intake pipe at a position downstream of the compressor 26 of the small-volume turbocharger 18, which positive pressure urges the diaphragm 34a to move against the force of the spring 34b so that the waste gate valve 32 is opened.

A second exhaust bypass passageway 36 is connected to the exhaust pipe 14 to bypass the turbine 28 of the small-volume turbocharger 18, and an exhaust switching butterfly valve 38 is arranged in the second bypass passageway 36. An actuator 40 is provided for operating the exhaust switching valve 38, and is constructed as a two-stage diaphragm mechanism, whereby the exhaust switching valve 38 is closed to close the second bypass passageway 36 before the large-volume turbocharger 16 reaches a fully activated condition, and the exhaust switching valve 38 is opened to open the second bypass passageway 36 when the large-volume turbocharger 16 reaches a fully activated condition. The actuator 40 is provided with diaphragms 40a and 40b, and springs 40c and 40d; the first diaphragm 40a being connected to the exhaust switching valve 38 via a rod 40e and the second diaphragm 40b being connected to a second rod 40f. The arrangement of the first and second rods 40e and 40f is such that the movement of the second rod 40f toward the first rod 40e causes the first rod 40e to be moved together with the second rod 40f, and the movement of the second rod 40f away from the first rod 40e causes the second rod 40f to be moved independently from the first rod 40e. A first chamber 40g is formed on one side of the second diaphragm 40b away from the spring 40d; the chamber 40g being connected to the intake pipe 12 at a position 60 located downstream of the compressor 26 of the small turbocharger 18 via a conduit 39. A chamber 40h is formed on one side of the diaphragm 40a away from the spring 40c, and will explained later, a turbocharged pressure or atmospheric air pressure is selectively introduced to the chamber 40h to thereby obtain a step-like opening of the exhaust switching valve 38. Namely, when the chamber 40h is opened to the atmospheric pressure, the opening of the exhaust switching valve 38 is controlled by the turbocharging pressure in the chamber 40g, which is opposed by the combined strong forces of the springs 40c and 40d, so that the speed of opening of the exhaust switching valve 38 is reduced. Conversely, when the chamber 40h is opened to the turbocharging pressure, the opening of the exhaust switching valve 38 is controlled by the pressure in the chamber 40h, which is opposed only by weak spring force by the spring 40c, and thus the speed of opening of the exhaust switching valve 38 is increased.

An intake bypass passageway 44 is connected to the intake pipe 12 so as to bypass the compressor 26 of the small-volume turbocharger 18, and an intake bypass control valve 46 is arranged in the intake bypass passageway 44. A diaphragm actuator 48 is provided for controlling the operation of the intake bypass valve 46; the actuator 48 being provided with a diaphragm 48a connected to the intake bypass valve 46, a chamber 48b on one side of the diaphragm remote from the valve 46, a chamber 48c on the other side of the diaphragm 48a near to the valve 46, and a spring 48d which urges the diaphragm 48a so that the valve 46 is closed. As will be explained later, the intake bypass valve 46 is closed when the small-volume turbocharger 18 is operated but the large-volume turbocharger is not yet fully operational. After a fully operational condition of the large sized turbocharger 16 is reached, a positive pressure is applied to the lower chamber 48c, and thus the intake bypass valve 46 is opened.

The internal combustion engine is provided with an exhaust gas recirculation (EGR) system, which includes an EGR passageway 50 and an EGR valve 52 arranged in the EGR passageway. The EGR valve 52 is provided with a diaphragm 52a, a valve member 52b connected to the diaphragm 52a, a spring 52c urging the diaphragm 52a so that valve member 52b closes the EGR passageway 50, and a chamber 52d on one side of the diaphragm 52a remote from the valve member 52b. A pressure from a vacuum pump 67 is applied to the chamber 52d, to open the valve 52b. According to the present invention, the EGR passageway 50 has an upstream end (exhaust gas taking-out port) 50A connected to the exhaust pipe 14 at a location downstream of the turbine 28 of the small-volume turbocharger 18 and upstream of the turbine 22 of the large-volume turbocharger 16, and has a downstream end (exhaust gas introduction port) 50B connected to the intake pipe 12 downstream of the intercooler 29.

A first three-port electromagnetic switching valve (VSV1) 54 controls the actuator 34 for the waste gate valve 32, whereby the valve 54 is switched between a first position (OFF position) at which the chamber 34c is opened to the atmospheric air pressure via an air cleaner 54-1, and a second position (ON position) at which the chamber 34c is opened to the intake pressure in the intake pipe 12 at a location 56 slightly upstream of the intercooler 29. When the valve 54 is in the first position, at which the chamber 34c is opened to the atmospheric pressure, the waste gate valve 32 is closed by the force of the spring 34b, and when the valve 54 is in the second position, at which the chamber 34c is opened to the turbocharged pressure at the location 56, the diaphragm 34a is moved against the force of the spring 34b so that the waste gate valve 32 is opened.

A second three-port electromagnetic switching valve (VSV2) 58 controls the pressure of the chamber 40h of the actuator 40 for the exhaust switching valve 38. This second electromagnetic switching valve 58 is moved between a first position (OFF position) at which the chamber 40h is opened to the atmospheric pressure via an air cleaner 58-1, and a second position (ON position) at which the chamber 40h is opened to the intake pressure at the outlet position 60 of the small-volume turbocharger 18. Note, the chamber 40g is always opened to the intake pressure at the outlet portion 60 of the small-volume turbocharger 18.

Third and fourth three-port electromagnetic switching valves 64 and 66 are provided for controlling the pressure of the actuator 48 for the intake bypass valve 46. Namely, the third electromagnetic switching valve (VSV3) 64 controls the pressure of the chamber 48b formed on the upper side of the diaphragm 48a, and thus the valve 64 is switched between a first position (OFF position) at which the chamber 48b is opened to the atmospheric pressure via an air cleaner 64-1, and a second position (ON position) at which the chamber 48b is opened to the output 60 of the compressor 26 of the small turbocharger 18. The fourth electromagnetic switching valve 66 (VSV4) controls the pressure of the chamber 48c on the lower side of the diaphragm 48a, and thus the valve 66 is switched between a first position (OFF position) at which the chamber 48c is opened to a vacuum pressure in the vacuum pump 67 driven by the crankshaft of the engine 10, and a second position (ON position) at which the chamber 48c is opened to the outlet 67 of the compressor 20 of the large-volume turbocharger 16.

A fifth three-port electromagnetic switching valve 70 (VSV5) controls the operation of the EGR valve 52, whereby the valve 70 is switched between a first position (OFF position) at which the chamber 52d is opened to the atmospheric pressure via an air cleaner 70-1, and a second position (ON position) at which the chamber 52c is opened to the vacuum pressure in the vacuum pump 67. As will be explained later, a pulse signal applied to the electromagnetic switching valve 70 has a duty ratio which is controlled to thus obtain a a desired exhaust gas recirculation (EGR) ratio.

A control circuit 72 controls the turbocharging operation of this invention, and outputs signals to the electromagnetic switching valves 54 (VSV1), 58(VSV2), 64(VSV3), 66(VSV4), and 70(VSV5). The control circuit 72 is connected to sensors for carrying out the control according to the present invention. Namely, a first pressure sensor 78 is provided for detecting the intake pressure $P_1$ at the outlet 67 of the compressor 20 of the large-volume turbocharger 16; a second pressure sensor 80 is provided for detecting the pressure $P_2$ of the intake air at the outlet 60 of the compressor 26 of the small turbocharger 18; a sensor 81 is provided for detecting the engine rotational speed NE; and a sensor 83 is provided for detecting the engine load by determining, for example, a position of an adjusting lever (not shown) of a fuel injection pump (not shown), which is a well known manner of connecting an accelerator pedal (not shown) to a device controlling the amount of fuel injected by the fuel injection pump.

Figure 2:
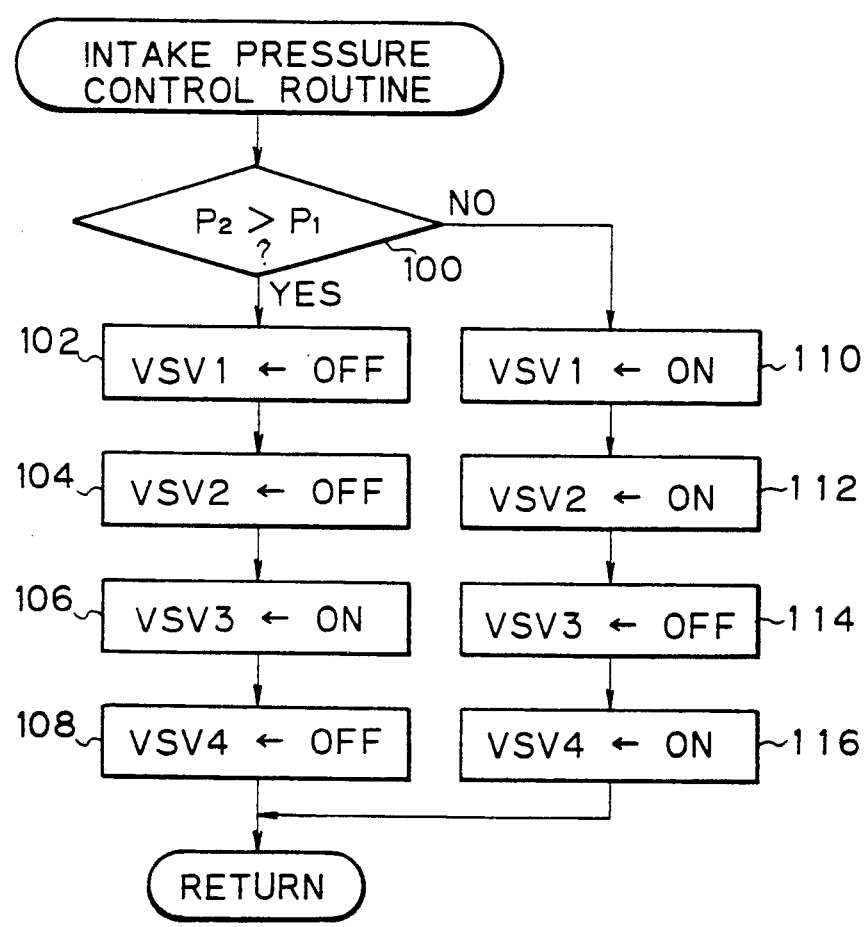
FIGS. 2 and 3 are flowcharts of the operation of a control circuit of FIG. 1.

The operation of the control circuit 72 in the first embodiment will now be explained with reference to FIGS. 2 and 3. FIG. 2 shows a routine for controlling an intake pressure. As shown in FIG. 2, at step 100, it is determined if the pressure $P_2$ at the outlet 60 of the compressor 26 of the small-volume turbocharger 18 is larger than the pressure $P_1$ at the outlet 67 of the large-volume turbocharger 16. FIG. 4 illustrates the relationships between the engine speed NE and the pressures $P_1$ and $P_2$ at the outlets of the turbochargers 16 and 18, respectively, while the degree of depression of the accelerator pedal is maintained unchanged. The solid lines indicate the pressure when the accelerator pedal is fully depressed, and the dotted lines indicate the pressure when the accelerator pedal is partly depressed. As is easily seen, in accordance with increase in the engine speed, an increase in the small turbocharger output pressure $P_2$ is faster than that of the large-volume turbocharger output pressure $P_1$. Accordingly, a result of $P_2 > P_1$ is obtained at step 100 in FIG. 2, when the engine speed is low, and thus the routine goes to step 102 and the first electromagnetic switching valve 54 (VSV1) is made OFF, which causes the chamber 34c to be opened to the atmospheric pressure and the spring 34b to urge the diaphragm 34a to close the waste gate valve 32. At the following step 104, the second electromagnetic switching valve 58 (VSV2) is made OFF, which causes the chamber 40h to be opened to the atmospheric air pressure, while the chamber 40g is always opened to the pressure $P_2$ at the small-volume turbocharger output 60. As a result, the pressure $P_2$ at the chamber 40g opened to the small-volume turbocharger output 60 is opposed by a set force which is the sum of the forces of the spring 40c and 40d. When the pressure $P_2$ is smaller than this set force, i.e., the engine speed is smaller than a predetermined value $NE_1$ or $NE_1'$ in FIG. 4., which values provide a intake pressure $P_{SET}$ corresponding to this spring force, the exhaust switching valve 38 is kept closed.

When the pressure $P_2$ reaches the set pressure $P_{SET}$, the force applied to the diaphragm 40b becomes larger than the combined set force of the springs 40c and 40d, and accordingly, the diaphragm 40b is moved against this combined set force, whereby the exhaust switching valve 38 is gradually opened.

In view of the operation of the intake bypass valve 45 during the engine low speed condition, at step 106, the electromagnetic switching valve 64 (VSV3) is made ON so that the chamber 48b above the diaphragm 48a is opened to the pressure $P_2$ at the output 60 of the compressor 26 of the small-volume turbocharger 18 so that the spring 48d urges the diaphragm 48a downward and thus the intake bypass valve 46 is closed.

Furthermore, at step 108, the electromagnetic switching valve 66 (VSV4) is made OFF, so that the chamber 48d below the diaphragm 48a is opened to the vacuum in the vacuum pump 67, whereby a force is applied to the diaphragm 48a, to move it downward, which assists the positive seating of the valve 46 when closing the bypass passageway 44.

As a result of an acceleration operation, the engine speed NE can increase to a value of $NE_2$ or $NE_2'$, whereby the pressure $P_1$ at the output of the compressor 20 of the large-volume turbocharger 16 is increased to the pressure $P_2$ at the output of the compressor 26 of the small-volume turbocharger ($P_1 = P_2$). If the result at step 100 is "NO", the routine goes to step 110, and the first electromagnetic switching valve 54 (VSV1) is made ON. As a result, the chamber 34c is opened to the port 56, and accordingly, the positive pressure thereat is applied to the diaphragm 34a to urge it to move against the force of the spring 34b, to thereby open the waste gate valve 32. At the following step 112, the electromagnetic switching valve 58 (VSV2) is made ON, and accordingly, a positive pressure at the outlet 60 of the compressor 26 of the small turbocharger 18 is applied to the chamber 40h, which moves the diaphragm 40a regardless of the pressure in the chamber 40g. As a result, the opening of the exhaust switching valve 38 is now controlled only by the pressure in the chamber 40h, which is opposed by a force of the spring 40c. Namely, the force of the spring 40d cannot move the exhaust switching valve 38 to the closed position. Accordingly, a step-like decrease in the set force moving the valve 38 in the closing direction is obtained, whereby a step-like opening movement of the exhaust switching valve 38 is obtained for a rapid opening of the valve 38 to the fully open position.

Finally, the operation for controlling the intake bypass valve in the first embodiment during the ending of the high speed condition ($NE > NE_1'$ or $NE > NE_2'$) is as follows. In FIG. 2, at step 114, the third electromagnetic switching valve 64 (VSV3) is made OFF, so that the upper side chamber 48b is opened to the atmospheric pressure via the air cleaner 64-1, and then at step 116, the fourth electromagnetic switching valve 66 (VSV4) is made ON, so that the lower side chamber 48c is opened to the positive pressure $P_1$ at the outlet of the compressor 20 of the large-volume turbocharger 16. As a result the positive pressure in the lower side chamber 48d moves the diaphragm 48a upward against the force of the spring 48d, and thus the intake bypass valve 46 is opened very quickly.

FIG. 4 illustrates the relationship between the engine speed and the intake pressures (turbocharging pressure) $P_1$ at the outlet of the compressor 20 of the large-volume turbocharger 16 and $P_2$ at the outlet of the compressor 26 of the small-volume turbocharger 18. As shown by the solid lines, which indicate a characteristic obtained when the accelerator pedal is fully depressed, the increase of the engine speed NE to the value of $NE_1$ made the pressure $P_2$ at the small-volume turbocharger output 60 equal to a preset value $P_{SET}$, and the increase in the engine speed NE to the value $NE_2$ makes the pressure $P_1$ at the large-volume turbocharger output 67 equal to the preset value $P_{SET}$ which is equal to $P_2$. As shown by the dotted lines, which indicate the characteristic obtained when the accelerator pedal is partly depressed, the increase of the engine speed NE to the value of $NE_1'$ ($>NE_1$) makes the pressure $P_2$ at the small-volume turbocharger output 60 equal to a preset value $P_{SET}$, and the increase in the engine speed NE to the value of $NE_2'$ ($>NE_2$) makes the pressure $P_1$ at the large-volume turbocharger output 67 equal to the preset value $P_{SET}$, which is equal to $P_2$.

Figure 3:
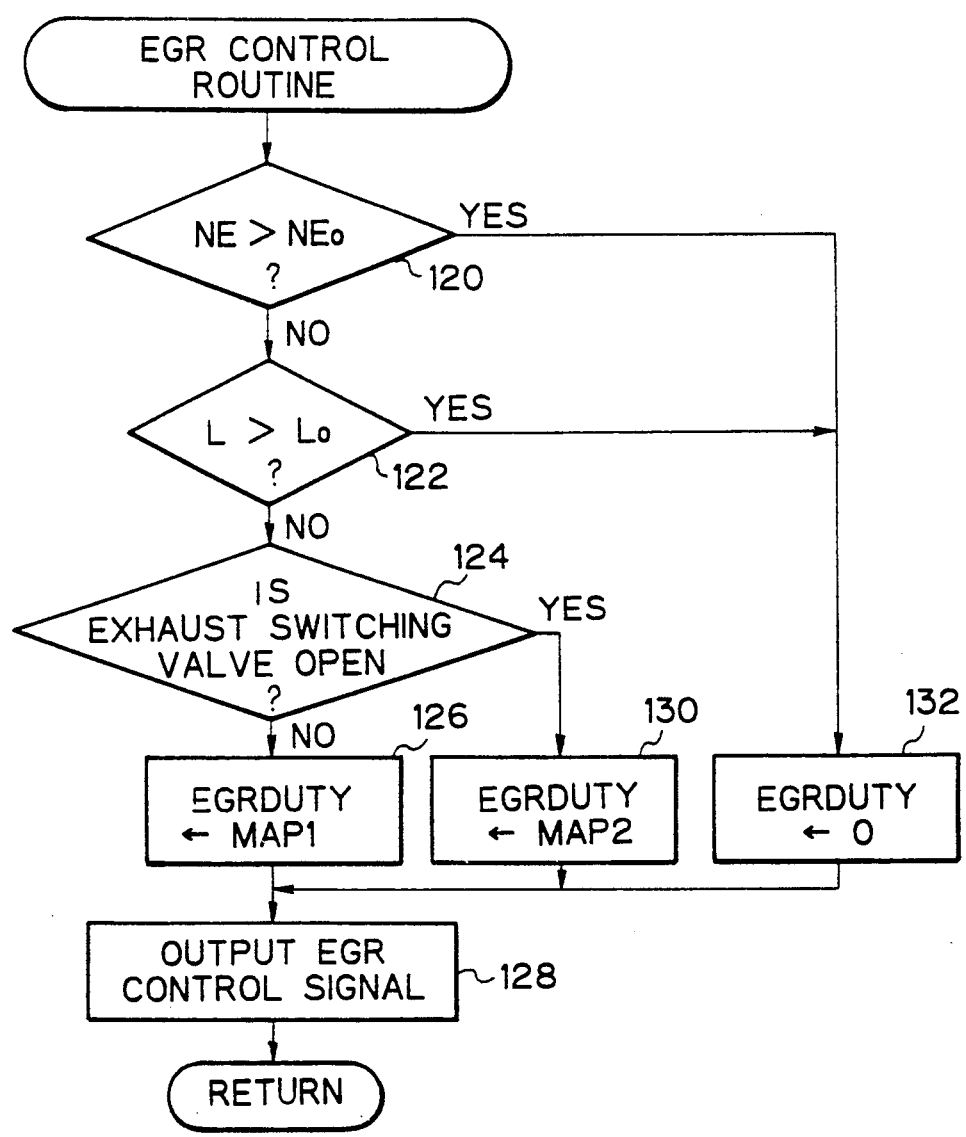
Figure 4:
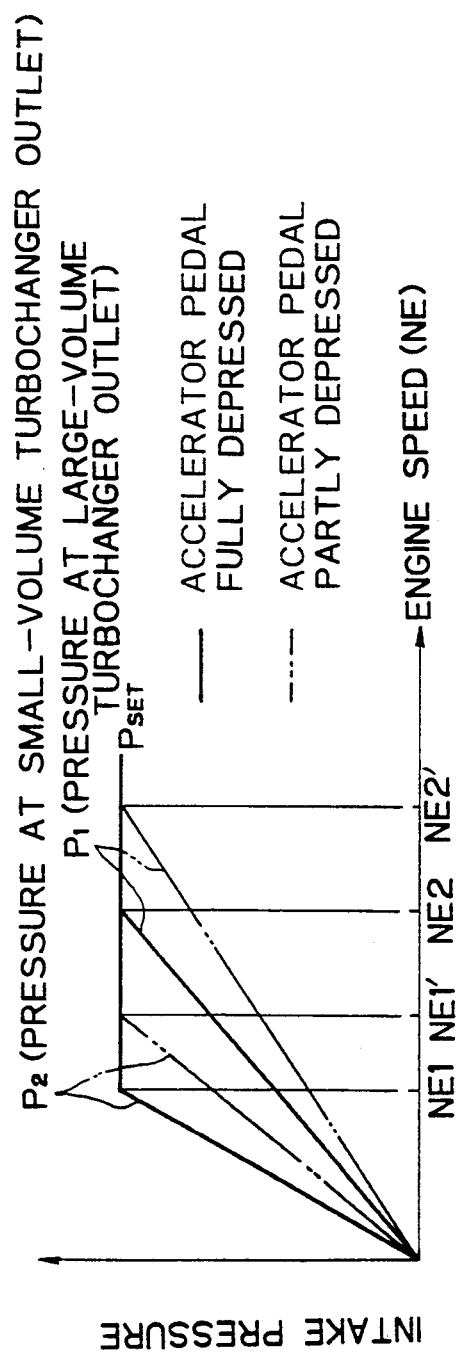
FIG. 4 shows a relationship between an engine speed and an intake pressure when an accelerator pedal is fully depressed (solid line) and when the accelerator pedal is partly depressed (dotted line), respectively.

FIG. 3 shows a routine for EGR control. At step 120, it is determined if the engine speed NE is larger than a predetermined value $NE_0$, and at step 122, it is determined if the engine load L is larger than a predetermined value $L_0$. When it is determined that $NE \leq NE_0$ and $L \leq L_0$, i.e., the engine is under a low speed and low load condition as shown by area defined by horizontal and vertical dotted lines m1 and m2, respectively, in FIG. 5, when an exhaust gas recirculation operation is to be carried out, the routine goes to step 124, and it is determined if the exhaust switching valve 38 is open, the routine goes to step 126 and a degree of opening of the EGR valve 52 is calculated from a first map (MAP1). Alternatively, the routine goes to step 130 and a degree of opening of the EGR valve 52 is calculated from a second map (MAP2). The reason for this operation of differentiating the degree of opening of the EGR valve 52 in accordance with the position of the exhaust switching valve 38 will now be described.

Figure 5:
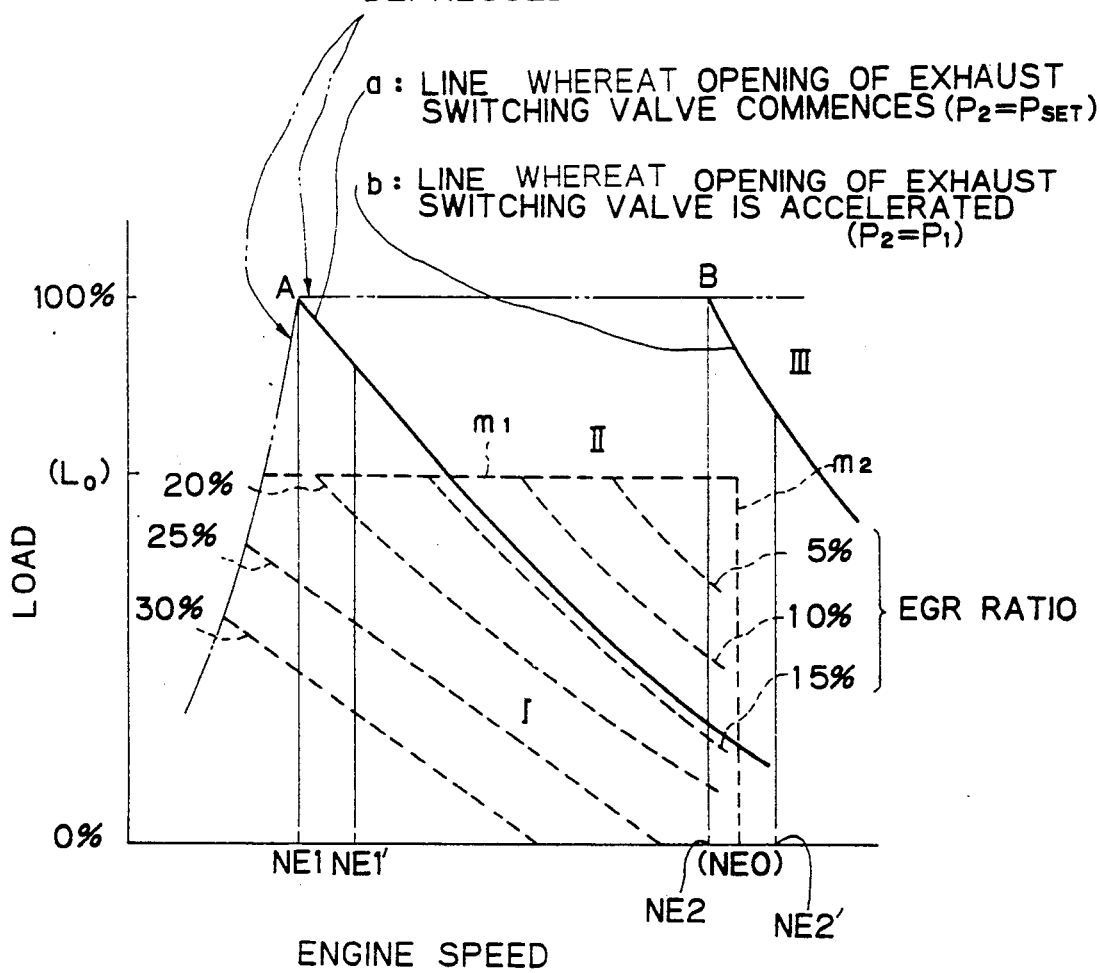
FIG. 5 shows, with regard to an engine speed and engine load, a line at which the opening of the exhaust switching valve is commenced, a line at which the exhaust switching valve is fully opened, and equal EGR rate lines.

The amount of EGR gas is basically determined in view of the combinations of the engine speed NE and engine load L. In FIG. 5, inclined dotted lines schematically indicate equal EGR ratio lines for values of the EGR ratio as designated. Namely, the EGR ratio is determined from a combination of the engine speed NE and engine load L. As is easily seen, the higher the engine speed or the higher the engine load, the smaller the EGR ratio. To obtain the designated setting of the EGR ratio, the pressure in the chamber 52d of the actuator 52 is controlled by changing the setting of the duty ratio of the pulse signal directed to the electromagnetic switching valve 70 (VSV5). The duty ratio, as is well known, is a ratio of a duration of an ON state to a duration of one cycle of the pulse signal output for operating the electromagnetic switching valve 70 (VSV5). The higher the duty ratio, the longer the duration of the ON state of the pulse signal; the longer the duration time, the stronger the vacuum in the vacuum chamber 52d of the actuator 52, and the stronger the vacuum pressure, the higher the lift of the EGR valve 52b, i.e., the greater the amount of recirculated exhaust gas obtained. Note, the amount of EGR gas obtained is determined not only by a degree of opening of the EGR valve 52 but also by a pressure difference across the EGR passageway 50, i.e., a difference between the pressure at the EGR gas taking out port 50A in the exhaust pipe 14 and the pressure at the EGR gas introducing port 50B in the intake pipe 12. According to the embodiment of the present invention, the pressure at the exhaust gas taking out port 50A is not affected by the opening or closing of the exhaust switching valve 38 located in the exhaust pipe 14 between the turbines 28 and 22. Nevertheless, the pressure at the exhaust gas adding port 50B is affected by the opening and closing of the exhaust switching valve 38, as the pressure at the exhaust gas introducing port 50B corresponds to the pressure $P_2$, if the pressure drop at the intercooler is neglected. As will be easily understood from FIG. 4, there is a smooth increase in the pressure $P_2$ up to the engine speed of $NE_1$ or $NE_1'$, and then the pressure $P_2$ is maintained substantially constant. Namely, the characteristic curve of $P_2$ has a non-continuous bent portion at the engine speed $NE_1$ or $NE_1'$, Contrary to this, the pressure $P_4$ at the exhaust gas taking out port 50A has a non-bending characteristic. As a result, there will be an non-continuous change in the value of the pressure difference $P_4 - P_2$ at the location where the closed exhaust switching valve 38 is opened. This means that the same value of the degree of opening of the EGR valve 52, i.e., the same value of the duty ratio (EGRDUTY), can change the amount of recirculated exhaust gas at a state where the exhaust switching valve 38 is closed and at a state where the exhaust switching valve 38 is opened. Accordingly, a single map of values of duty ratio corresponding to the desired setting of the EGR ratio is not sufficient to obtain a desired EGR ratio for both the closed and opened states of the exhaust switching valve 38. Therefore, two maps of duty ratio values are provided; one map being used for calculating the EGR ratio when the exhaust switching valve 38 is closed, and the other map being used for calculating the EGR ratio when the exhaust switching valve 38 is opened. As will be understood from FIG. 3, when it is determined that the exhaust switching valve 38 is closed at step 124, the first map MAP1 is selected at step 126, to calculate the duty ratio EGRDUTY, which indicates a value of the duty ratio of the pulse signal for operating the electromagnetic switching valve 70 (VSV5), which operates the EGR valve 52. This map MAP1 has duty ratio EGRDUTY values for obtaining a desired value of the EGR ratio determined by values of a combination of the engine speed NE and engine load L when the exhaust switching valve 38 is closed and all of the exhaust gas is introduced into the turbine 28 of the small-volume turbocharger 18. At step 126, the control circuit 72 executes a map interpolation calculation from the first map MAP1, to obtain a value of the duty ratio corresponding to the value of the engine speed NE and engine load L detected by the engine speed sensor 81 and engine load sensor 83. Then at step 128, a pulse signal having a value of the duty ratio EGRDUTY calculated at step 126 is output to the electromagnetic switching valve 70 (VSV5), to control the lift of the EGR valve 52 to thereby obtain the desired value of the EGR ratio calculated at the step 126.

When it is determined that the exhaust switching valve 38 is open, the routine goes from step 124 to step 130, where the calculation of the duty ratio EGRDUTY is carried out by using the second map MAP2. This map MAP2 has duty ratio values needed to obtain desired values of the EGR ratio with respect to combinations of the values of the engine speed and engine load when the exhaust switching valve 38 is open. A map interpolation calculation is similarly carried out, so that a value of the duty ratio EGRDUTY corresponds to a value of a desired EGR ratio corresponding to a combination of the engine speed NE and load L detected by the sensors 81 and 83, respectively. As a result, a lift of the EGR valve 52 is controlled such that the desired EGR ratio for the open condition of the exhaust switching valve 38 is obtained.

When the engine is under a high speed and/or high load condition, i.e., $NE > NE_0$ or $L > L_0$, where the EGR operation is canceled, the routine goes from step 120 or 122 to step 132, where a zero is moved into the EGRDUTY so that a continuous low level signal for the electromagnetic switching valve 70 (VSV5) is obtained, whereby the pressure at the chamber 52d is made equal to the atmospheric pressure, and thus the EGR valve 52 is fully closed.

Instead of providing two kinds of maps MAP1 and MAP2 for the values of the duty ratio, a correction factor may be employed for compensating the relationship between the values of the duty ratio and the values of the EGR ratio as actually obtained, which relationship is changed in accordance with whether the exhaust switching valve 38 is closed or open. In this case, one and the same map will be used at both steps 126 and 130 in FIG. 3. Nevertheless, the correction factor which is multiplied by the duty ratio EGRDUTY is controlled in accordance with the positions of the exhaust switching valve 38, and thus a desired EGR ratio is obtained regardless of the position of the exhaust switching valve 38.

As shown in FIG. 5, the EGR operation is carried out in the region of the engine speed and the engine load inside the dotted lines m1 and m2 (engine low speed or low load condition). Dotted lines n, which correspond to solid lines designated $P_2$ in FIG. 4, show how the intake pressure changes with respect to the change in the engine speed when the accelerator pedal is fully depressed. At a point A, which corresponds to the point where $NE = NE_1$ in FIG. 4, the exhaust switching valve 38 begins to open. The line a, which extends from the point A, shows points where the exhaust switching valve 38 begins to open at the combinations of a designated engine speed and engine load, during the partial load condition. Namely, the line a corresponds to the "equal pressure line" where the pressure $P_2$ downstream of the compressor 26 of the small-volume turbocharger 18 has reached the preset value $P_{SET}$. As can be easily understood, the smaller the degree of the depression of the accelerator pedal, the higher the value of the engine speed NE, where the pressure $P_2$ is equal to the preset pressure value $P_{SET}$.

The point B in FIG. 5 shows the point where the pressure $P_1$ downstream of the compressor 20 of the large-volume turbocharger 16 becomes equal to the pressure $P_1$ downstream of the compressor 26 of the small-volume turbocharger 18 (No at step 100 in FIG. 2), so that the exhaust switching valve 38 is quickly and fully opened when the accelerator pedal is fully depressed. The line b, which extends from the point B, shows points where the exhaust switching valve 38 is fully opened during the partial load condition. Namely, the line b corresponds to the "equal pressure line" where a relationship of $P_1 = P_2 = P_{SET}$ is obtained at the partial load condition of the engine. As can be easily understood, the smaller the degree of the depression of the accelerator pedal, the higher the value of the engine speed NE at which the relationship of $P_1 = P_2 = P_{SET}$ is obtained at the partial load condition of the engine.

In FIG. 5, the region I below the line a is an area wherein the small-volume turbocharger 18 is mainly operated, to obtain the desired intake pressure. A region II between the line a and b is an area wherein both the small-volume turbocharger 18 and the large-volume turbocharger 16 are operated. Furthermore, the region III above the line c is an area wherein only the large-volume turbocharger 16 is operated to obtain the desired intake pressure. The EGR area depicted by the lines m1 and m2 extends between the first and second area I and II.

Figure 6:
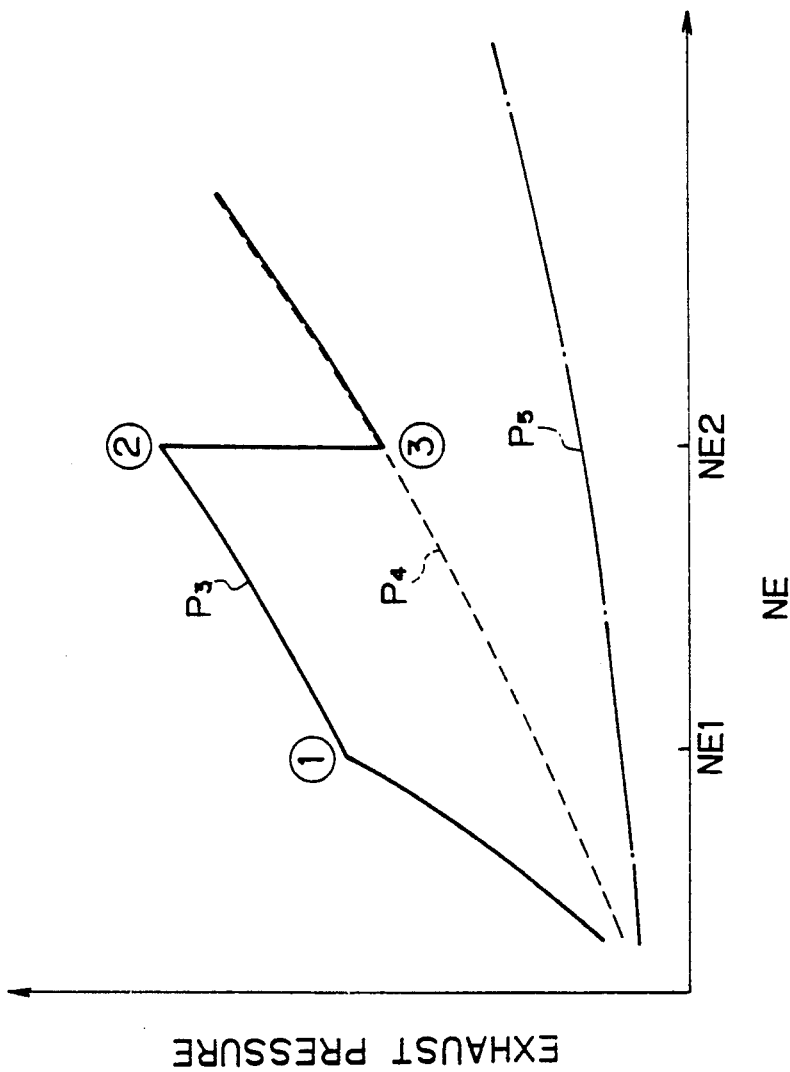
FIG. 6 shows the relationships between an engine speed and a pressure of the exhaust gas at various locations in the exhaust line.

FIG. 6 shows relationships between the engine speed NE and the exhaust pressure at various portions of the exhaust pipe 14, wherein $P_3$ is a pressure at a location upstream of the turbine 28 of the small-volume turbocharger 18, $P_4$ is a pressure at the occasion between the turbine 28 of the small-volume turbocharger 18 and the turbine 22 of the large-volume turbocharger 16, and $P_5$ is a pressure at the location downstream of the turbine 22 of the large-volume turbocharger 16. As will be easily understood, the pressures $P_4$ and $P_5$ are continuously increased as the engine speed is increased. Contrary to this, the behavior of the pressure $P_3$ with respect to the change in the increase in the engine speed is rather complicated. Namely, the pressure $P_3$ upstream of the turbine 28 of the small-volume turbocharger 18 is greatly changed by the opening or closing of the exhaust switching valve 38 as already explained with reference to FIG. 4. Namely, the circled point 1 corresponds to a point at which the exhaust switching valve 38 is first opened, the circled point 2 is a point at which the exhaust switching valve 38 is fully opened in a step-like manner, whereby the pressure is abruptly decreased to the circled point 3 as to obtain a value that is same as $P_4$. As well known, the amount of recirculated exhaust gas is affected by the pressure of the exhaust gas. Namely, the amount of EGR gas is proportional to the difference of the pressure of the intake pipe from the pressure in the exhaust pipe. This means that the degree of opening of the EGR valve 52 should be determined to obtain the desired amount of the EGR gas regardless of the pressure characteristic determined in accordance with the position at the exhaust pipe at which the exhaust gas for EGR operation is taken out.

Further, the measures must taken to prevent a reduction of the thermal durability of the parts constructing the EGR system. Namely, the removal of the exhaust gas for recirculation from the exhaust pipe 14 at the position upstream of the turbine 28 of the small-volume turbocharger 18 causes parts of the EGR system which are less resistant to a high temperature, such as the diaphragm 52a, to be quickly damaged, since the position is located near the exhaust port of the engine 10, which has a very high temperature. Furthermore, the removal of the exhaust gas for recirculation at the position downstream from the turbine 22 of the large-volume turbocharger 16 causes difficulties in the introduction of the exhaust gas into the intake pipe 12, since the pressure $P_5$ at this portion is small. Contrary to this, the removal of the exhaust gas for recirculation at the position 50A between the turbines 28 and 30 enables thermal damage to be suppressed while maintaining a relatively high pressure $P_4$ of the exhaust gas.

In a modification of the first embodiment, instead of connecting the EGR pipe 50 to the position 50B downstream of the intercooler 29 as shown in FIG. 1, the EGR pipe, as shown by a dotted line 50', can be connected to the intake pipe 12 at a position between the compressor 20 of the large-volume turbocharger 16 and the compressor 26 of the small-volume turbocharger 18. According to this modified construction, the pressure in the exhaust passageway 50 is not affected by the opening or closing of the exhaust switching valve 80, not only at the position (50A) where the exhaust gas for recirculation is taken out but also at the position (50') where the exhaust gas for the recirculation is added. This means that the pressure difference between the exhaust gas taking out port and exhaust gas adding port is not affected by the opening or closing of the exhaust switching valve 38, and thus, in order to control the EGR ratio, instead of the two duty ratio maps MAP1 and MAP2 used in the embodiment in FIG. 3, only one map for the duty ratio is sufficient to obtain a desired EGR ratio.

Figure 7:
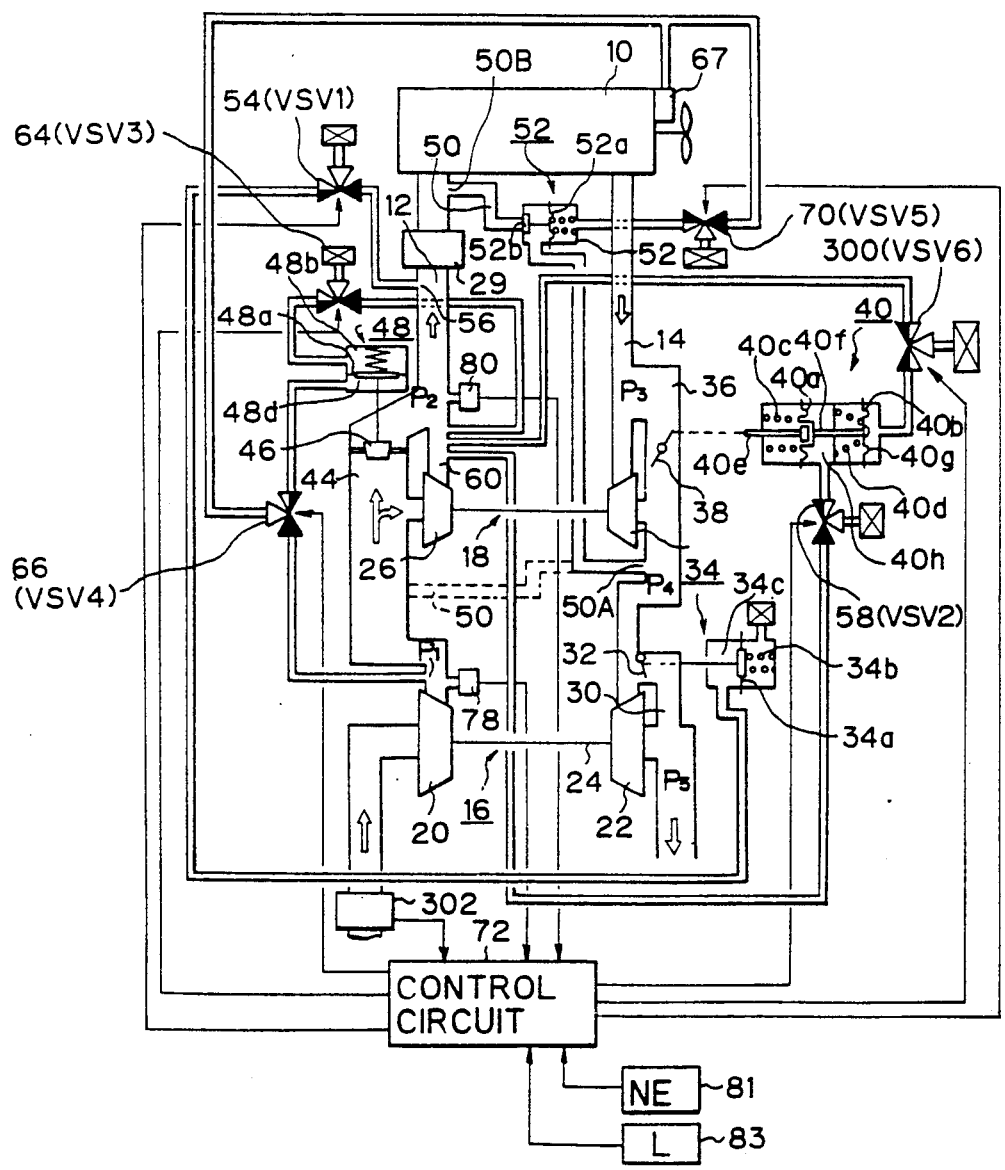
FIG. 7 is similar to FIG. 1 but shows a second embodiment.

FIG. 7 shows the second embodiment of the present invention, wherein the exhaust switching valve 38 is controlled by detecting the intake pressure, as in the first embodiment, when the engine is under a low speed condition, and by the intake air amount when the engine is under a high speed condition. FIG. 7 is different from FIG. 1 in that an electromagnetic switching valve 300 (VSV6) is additionally provided for controlling the pressure to the diaphragm chamber 40g of the actuator 40 for the exhaust switching valve 38. The electromagnetic switching valve 300 (VSV6) is switched between a position at which the diaphragm chamber 40g is connected to the intake pipe 12 at the position 60 downstream of the compressor 26 of the small-volume turbocharger 18 and a position at which the diaphragm chamber 40g is connected to the atmospheric pressure. Furthermore, an air flow meter 302 is provided in the intake pipe 12 upstream of the compressor 20 of the large-volume turbocharger 16, for detecting the intake air amount Q.

Figure 8:
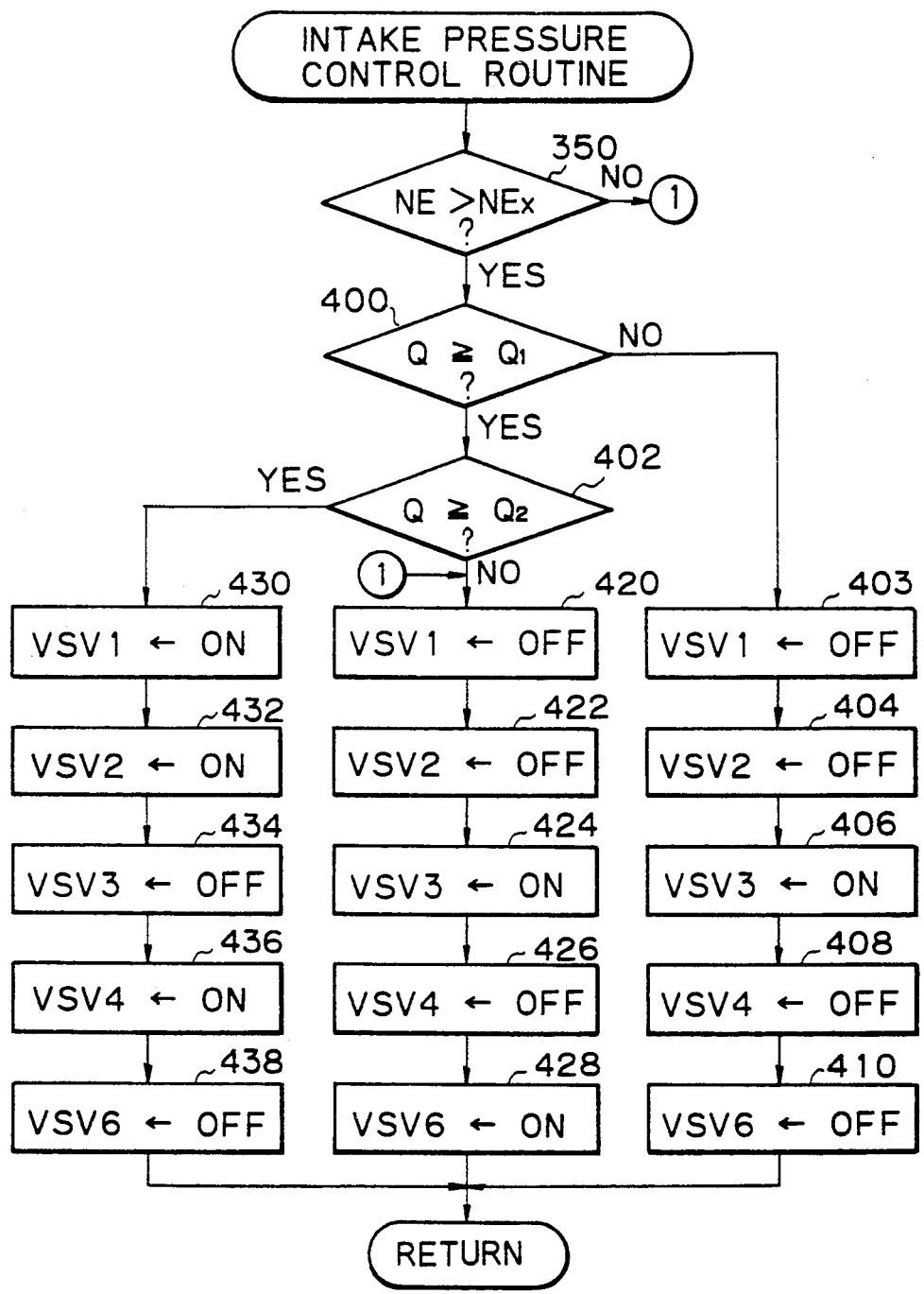
FIG. 8 shows a flowchart of an intake pressure control routine of the second embodiment.

FIG. 8 shows an intake pressure control routine. At step 350 it is determined whether the engine speed NE is larger than a predetermined value $NE_x$. The $NE_x$ is a threshold value between the exhaust switching valve control based on the intake pressure and the exhaust switching valve control based on the intake air amount. As shown in FIG. 9, the $NE_x$ is a value of the engine speed when the exhaust switching valve 38 is fully open and the accelerator pedal is fully depressed. When it is determined that $NE > NE_x$, the routine goes to step 400, where it is determined if the intake air amount Q is larger than a predetermined value $Q_1$, and to step 402, where it is determined if the intake amount Q is larger than a predetermined value $Q_2 (>Q_1)$. The value $Q_1$ is a threshold value above which the exhaust switching valve 38 is opened. When it is determined that $Q < Q_1$ at step 400, the routine goes to step 403, where the electromagnetic switching valve 54 (VSV1) is made OFF so that the diaphragm 34c is opened to the atmospheric pressure, whereby the spring 34b urges the diaphragm 40a to close the waste gate valve 32. At step 404, the second electromagnetic switching valve 58 (VSV2) for controlling the exhaust switching valve 38 is made OFF, so that the diaphragm 40h is opened to the atmospheric pressure. At step 406, the third electromagnetic switching valve 64 (VSV3) is made ON, and at step 408, the fourth electromagnetic switching valve 66 (VSV4) is made ON. The steps 406 and 408 are the same as steps 106 and 108 in FIG. 2, and thus the intake bypass valve 46 is closed, and accordingly, the intake pressure is lower than the predetermined value $P_{SET}$. At step 410, the sixth electromagnetic switching valve 300 (VSV6) is made OFF, so that the chamber 40g is opened to the atmospheric pressure and the exhaust switching valve 38 is closed.

When it is determined that the intake air amount $Q \geq Q_1$ at step 400, and $Q < Q_2$ at step 402, the routine goes to the steps following step 420. The steps 420 to 426 are the same as steps 403 to 408. At step 428, the electromagnetic switching valve 300 (VSV6) is made ON, so that the chamber 40g is opened to the intake pressure, while the OFF position of the electromagnetic switching valve 58 (VSV2) at step 422 allows the turbocharging pressure acting on chamber 40h to urge the exhaust switching valve 38 to open against the strong combined force of the springs 40c and 40d. As a result, a controlled or gradual opening of the exhaust switching valve 38 is obtained.

When it is determined at step 402, that $Q \geq Q_2$, the routine goes to steps below 430, which are the same as steps 110 to 116 in FIG. 1. Namely, at step 430, the electromagnetic switching valve 54 (VSV1) is made ON, so that the chamber 34c is opened to the intake positive pressure, whereby the diaphragm 34a is moved against the force of the spring 34b and the waste gate valve 32 is urged open. At step 432, the second electromagnetic switching valve 58 (VSV2) is made ON, so that the chamber 40h is opened to the intake positive pressure, and thus the force urging the exhaust switching valve 38 open becomes independent of the force of the spring 40d and is opposed only by the weak force of the spring 40c alone, and as a result, the actuator 40 allows the exhaust switching valve 38 to be instantaneously and rapidly opened. Steps 434 and 436 are for opening the intake bypass valve 46, and are similar to steps 114 and 116 in FIG. 2. Furthermore, at step 438, the electromagnetic switching valve 300 (VSV6) is made OFF, so that the chamber 40g is opened to the atmospheric pressure.

When it is determined at step 350, that the NE≦NE$_x$, the routine goes to steps 420 to 428, which are the same as steps 102 to 108 in the first embodiment of FIG. 2. Namely, the engine is in a low speed condition and the exhaust switching valve 38 is fully closed when intake pressure P$_2$ at the position downstream of the turbine 26 of the small-volume turbocharger 18 is lower than a predetermined value P$_{SET}$. When the intake pressure P$_2$ reaches the predetermined value P$_{SET}$, the exhaust switching valve 38 is gradually opened in accordance with an increase in the engine speed.

FIG. 9 shows the operation of the exhaust switching valve 38 with respect to the engine speed and load in the second embodiment. A vertical line X corresponds to the engine speed, which is equal to NE$_x$. In the area where the engine speed is higher than this value NE$_x$, the control of the exhaust switching valve 38 is carried out by the intake air amount Q. The exhaust switching valve 38 begins to open when the line Q=Q$_1$ is crossed, and is quickly opened toward the fully open position when the line Q=Q$_2$ is crossed. When the engine speed is lower than NE$_x$, the control of the exhaust switching valve 38, as in the first embodiment, is carried out by the intake pressure. When the line P=P$_2$=P$_{SET}$ is crossed, the exhaust switching valve 38 begins to open. It should be noted that the setting is such that the line P$_2$=P$_{SET}$ in the area I is smoothly connected to the line Q=Q$_2$ in the area II in FIG. 9.

The control of the exhaust switching valve by the intake pressure during the low engine speed and by the intake air amount during the high engine speed can prevent a drop in the intake pressure when the engine speed is high, which often occurs in a conventional turbocharger system.

The EGR control in this second embodiment is substantially the same as in the first embodiment. Namely, the same routine as in FIG. 3 can be employed. The range for executing the EGR operation can be same as that in the first embodiment, i.e., can be located between the regions I and II. Nevertheless, as shown in FIG. 9, the EGR region can be limited to the first region I as shown by the dotted area, and in this case, steps 124 and 130 can be eliminated.

Although embodiments of the present invention are described with reference to the attached drawings, many modifications and changes can be made by those skilled in this art.

We claim:

1. An internal combustion engine, comprising:
an engine body;
an intake line for introducing a combustible mixture into the engine body;
an exhaust line for removing the exhaust gas from the engine body;
a first, large-volume turbocharger having a turbine thereof arranged in the exhaust line and a compressor thereof arranged in the intake line;
a second, small-volume turbocharger having a turbine thereof arranged in the exhaust line at position upstream of the turbine of the large-volume turbocharger in the direction of the flow of the exhaust gas, and a compressor thereof arranged in the intake line at a position downstream of the compressor of the large-volume turbocharger in the direction of the flow of the intake air;
a bypass passageway connected to the exhaust line so as to bypass the turbine of the small-volume turbocharger;
exhaust switching valve means for controlling the flow of the exhaust gas in said bypass passageway;
means, responsive to engine operating conditions, for controlling the exhaust switching valve means to obtain a desired intake air pressure, and;
exhaust gas recirculation means for taking out an amount of exhaust gas from the exhaust line at a position located between the turbine of the large-volume turbocharger and the turbine of the small-volume turbocharger, and for introducing the taken out exhaust gas into the intake line.

2. An internal combustion engine according to claim 1, wherein said exhaust recirculation means comprise passageway means for connecting the exhaust line at a position located between the turbine of the large-volume turbocharger and the turbine of the small-volume turbocharger to the intake line, valve means for controlling the amount of exhaust gas recirculated through the passageway means, and control means, responsive to engine operating conditions, for operating said valve means.

3. An internal combustion engine according to claim 2, wherein said passageway means is connected to the intake line at a position downstream of the compressor of the small-volume turbocharger.

4. An internal combustion engine according to claim 2, wherein said passageway means is connected to the intake line at position between the compressors of the large-volume and small-volume turbochargers.

5. An internal combustion engine, comprising:
an engine body;
an intake line for introducing a combustible mixture into the engine body;
an exhaust line for removing exhaust gas from the engine body;
a first, large-volume turbocharger having a turbine thereof arranged in the exhaust line, and a compressor thereof arranged in the intake line;
a second, small-volume turbocharger having a turbine thereof arranged in the exhaust line, at a position upstream of the turbine of the large-volume turbocharger in a direction of the flow of the exhaust gas, and a compressor thereof arranged in the intake line at a position downstream of the compressor of the large-volume turbocharger in the direction of the flow of the intake air;
a bypass passageway connected to the exhaust line so as to bypass the turbine of the small-volume turbocharger;
exhaust switching valve means for controlling the flow of the exhaust gas in said bypass passageway;
means, responsive to engine operating conditions, for controlling a two-stage operation of the exhaust switching valve means in such a manner that the exhaust switching valve is gradually opened when a preset pressure of the intake air at a position downstream of the small-volume turbocharger in the intake line is obtained, and is quickly opened when the preset pressure is obtained in the intake line at the position downstream of the compressor of the large-volume turbocharger, and;
exhaust gas recirculation means for taking out an amount of exhaust gas from the exhaust line at a position located between the turbine of the large-volume turbocharger and the turbine of the small-volume turbocharger and for introducing the taken out exhaust gas into the intake line.

6. An internal combustion engine according to claim 5, wherein said exhaust recirculation means comprise passageway means for connecting the exhaust line at the position located between the turbine of the large-volume turbocharger and the turbine of the small-volume turbocharger to the intake line at a position downstream of the compressor of the small-volume turbocharger, valve means for controlling the amount of exhaust gas recirculated through the passageway means, means for detecting engine operating conditions, and control means, responsive to the detected engine operating condition, for operating said valve means to maintain a desired value of the recirculated amount of the exhaust gas regardless of the two-stage operation of the exhaust switching valve.

7. An internal combustion engine according to claim 6, wherein said control means comprise means for detecting an opened or closed condition of the exhaust switching valve means, and means, responsive to the condition detected by the exhaust switching valve, for calculating a degree of opening of the exhaust gas recirculation valve to thereby obtain a desired amount of exhaust gas.

8. An internal combustion engine according to claim 7, wherein said calculating means comprise a first map means for calculating a setting of the degree of opening of the exhaust gas recirculation valve means, to thereby obtain a desired amount of exhaust gas as recirculated when the exhaust switching valve is closed, and second map means for calculating a setting of the degree of opening of the exhaust gas recirculation valve means, to thereby obtain a desired amount of the exhaust gas as recirculated when the exhaust switching valve is open.

9. An internal combustion engine, comprising:
an engine body;
an intake line for introducing a combustible mixture into the engine body;
an exhaust line for removing the exhaust gas from the engine body;
a first, large-volume turbocharger having a turbine thereof arranged in the exhaust line, and a compressor thereof arranged in the intake line;
a second, small-volume turbocharger having a turbine thereof arranged in the exhaust line at position upstream of the turbine of the large-volume turbocharger in the direction of the flow of the exhaust gas, and a compressor thereof arranged in the intake line at a position downstream of the compressor of the large-volume turbocharger in the direction of the flow of the intake air;
a bypass passageway connected to the exhaust line so as to bypass the turbine of the small turbocharger;
exhaust switching valve means for controlling the flow of the exhaust gas in said bypass passageway;
a first pressure sensor arranged in the intake line at a position downstream of the compressor of the large-volume turbocharger;
a second pressure sensor arranged in the intake line at a position downstream of the compressor of the small-volume turbocharger;
actuator means for obtaining a two-stage operation of the exhaust switching valve;
step operation control means for operating the actuator in such a manner that the actuator controls the exhaust switching valve so that said valve is gradually opened when the second sensor detects a preset value of the intake pressure and is quickly opened when the first sensor detects the preset value of the intake pressure, and;
exhaust gas recirculation means for taking out an amount of exhaust gas from the exhaust line at a position located between the turbine of the large-volume turbocharger and the turbine of the small-volume turbocharger and for introducing the taken out exhaust gas into the intake line.

10. An internal combustion engine according to claim 9, further comprising a sensor for detecting the engine speed, a sensor for detecting the amount of the intake air introduced into the engine, and second step operation control means for operating the actuator, when it is determined that engine speed is higher than a predetermined value, in such a manner that the actuator controls the exhaust switching valve so that said valve is gradually opened when the intake air amount sensor detects a first preset value of the intake air amount and is quickly opened when the intake air amount sensor detects a second preset value of the intake air amount which is larger than the first preset value of the intake air amount.

* * * * *